(12) United States Patent
Stauber et al.

(10) Patent No.: US 9,678,640 B2
(45) Date of Patent: Jun. 13, 2017

(54) VIEW MANAGEMENT ARCHITECTURE

(71) Applicant: Microsoft Corporation, Redmond, WA (US)

(72) Inventors: William Scott Stauber, Seattle, WA (US); Ramrajprabu Balasubramanian, Renton, WA (US); Patrick Derks, Seattle, WA (US); Kenton Allen Shipley, Woodinville, WA (US); Darren Ray Davis, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/495,376

(22) Filed: Sep. 24, 2014

(65) Prior Publication Data
US 2016/0085417 A1  Mar. 24, 2016

(51) Int. Cl.
*G06F 3/0482* (2013.01)
*G06F 3/0484* (2013.01)
*G06F 9/44* (2006.01)

(52) U.S. Cl.
CPC ........ *G06F 3/04842* (2013.01); *G06F 3/0482* (2013.01); *G06F 9/4445* (2013.01)

(58) Field of Classification Search
CPC .................................................. G06F 3/0482
(Continued)

(56) References Cited

U.S. PATENT DOCUMENTS 6,748,195 B1  6/2004  Phillips
6,941,356 B2  9/2005  Meyerson
(Continued)

FOREIGN PATENT DOCUMENTS

EP  2701044 A1  2/2014
WO  2009143294 A1  11/2009
(Continued)

OTHER PUBLICATIONS

Teng, Albert, "Share Android Device Screen with Other Devices", Published on: Dec. 17, 2012, pp. 4, Available at: http://www.youtube.com/watch?v=Ygng30ir1tc.
(Continued)

*Primary Examiner* — Reza Nabi
(74) *Attorney, Agent, or Firm* — Cooper Legal Group, LLC

(57) ABSTRACT

Multi-display computing environments are often represented as a unified coordinate space, where each display presents application views within a coordinate region. Such arrangements may enable features such as application views that span multiple displays, but such features may not appeal to users. Additionally, such representations may complicate the application of layouts to particular displays while maintaining relationships among application views. Instead, a view management architecture may generate a user interface collection comprising, for respective displays, an arrangement of view entries for respective views presented on the display. Entries for new views may be added to the arrangement for a particular display, and may be contained within an application container encapsulating all views of an application on the display. This multi-display representation enables display layouts to be applied to the views within a particular display while preserving relationships among views presented by each of several displays of the computing environment.

20 Claims, 8 Drawing Sheets

(58) Field of Classification Search
USPC .................................................... 715/788
See application file for complete search history.

(56) References Cited

U.S. PATENT DOCUMENTS

| | | | |
|---|---|---|---|
| 7,437,183 B2 | 10/2008 | Makinen | |
| 7,523,226 B2 | 4/2009 | Anderson et al. | |
| 7,574,469 B2 | 8/2009 | Lorencz | |
| 7,716,273 B2 | 5/2010 | Soin et al. | |
| 7,840,509 B1 | 11/2010 | Messina | |
| 7,937,075 B2 | 5/2011 | Zellner | |
| 8,041,296 B2 | 10/2011 | Skog et al. | |
| 8,150,945 B2 | 4/2012 | Karaoguz et al. | |
| 8,418,072 B1* | 4/2013 | Bauer | G06F 8/38 709/223 |
| 8,504,936 B2* | 8/2013 | Gimpl | G06F 1/1616 715/751 |
| 8,520,000 B2* | 8/2013 | Duncker | G06F 17/30873 345/418 |
| 8,549,425 B2* | 10/2013 | Sakamoto | G06F 3/0481 353/30 |
| 8,711,552 B2 | 4/2014 | Medica et al. | |
| 8,762,896 B2* | 6/2014 | Lee | G06F 3/0488 345/1.1 |
| 9,405,459 B2* | 8/2016 | Sirpal | G06F 3/0488 |
| 9,448,811 B2* | 9/2016 | Culshaw | G06F 1/24 |
| 2002/0054141 A1* | 5/2002 | Yen | G06F 3/0481 715/804 |
| 2003/0055738 A1 | 3/2003 | Alie | |
| 2003/0189597 A1* | 10/2003 | Anderson | G06F 3/0481 715/778 |
| 2003/0214458 A1 | 11/2003 | Giemborek et al. | |
| 2006/0203758 A1 | 9/2006 | Tee et al. | |
| 2007/0299796 A1 | 12/2007 | Macbeth et al. | |
| 2008/0005693 A1 | 1/2008 | Oliver et al. | |
| 2008/0248834 A1 | 10/2008 | Chatterjee et al. | |
| 2010/0064228 A1 | 3/2010 | Tsern | |
| 2011/0033971 A1 | 2/2011 | Koo et al. | |
| 2011/0066971 A1* | 3/2011 | Forutanpour | G06F 9/4443 715/788 |
| 2011/0130178 A1 | 6/2011 | Shin et al. | |
| 2011/0214162 A1 | 9/2011 | Brakensiek et al. | |
| 2011/0221765 A1 | 9/2011 | Nason et al. | |
| 2011/0230178 A1 | 9/2011 | Jones et al. | |
| 2011/0246891 A1* | 10/2011 | Schubert | G06F 9/4445 715/719 |
| 2011/0246904 A1* | 10/2011 | Pinto | G06F 9/4445 715/740 |
| 2011/0307841 A1 | 12/2011 | Boldyrev et al. | |
| 2012/0017147 A1 | 1/2012 | Mark | |
| 2012/0050183 A1 | 3/2012 | Lee | |
| 2012/0176396 A1 | 7/2012 | Harper et al. | |
| 2012/0210266 A1 | 8/2012 | Jiang et al. | |
| 2012/0266079 A1 | 10/2012 | Lee et al. | |
| 2012/0282914 A1 | 11/2012 | Alexander | |
| 2013/0024778 A1 | 1/2013 | Reeves et al. | |
| 2013/0055102 A1 | 2/2013 | Matthews et al. | |
| 2013/0057572 A1* | 3/2013 | Anderson | G06F 9/4443 345/619 |
| 2013/0073932 A1 | 3/2013 | Migos et al. | |
| 2013/0076591 A1* | 3/2013 | Sirpal | G06F 3/1438 345/1.3 |
| 2013/0167159 A1 | 6/2013 | Ricci et al. | |
| 2013/0179838 A1 | 7/2013 | LeVee et al. | |
| 2013/0187861 A1* | 7/2013 | Lavallee | G06F 9/543 345/173 |
| 2013/0214996 A1* | 8/2013 | Reeves | G09G 5/14 345/1.3 |
| 2013/0258037 A1 | 10/2013 | Kim et al. | |
| 2013/0278484 A1* | 10/2013 | Hwang | G06F 3/1423 345/2.3 |
| 2013/0283193 A1 | 10/2013 | Griffin | |
| 2013/0332846 A1* | 12/2013 | Freedman | H01B 7/292 715/745 |
| 2013/0335340 A1 | 12/2013 | Smith | |
| 2014/0118222 A1* | 5/2014 | Barrett | G01C 21/3688 345/2.2 |
| 2014/0129695 A1 | 5/2014 | Yerli | |
| 2014/0181715 A1* | 6/2014 | Axelrod | G06F 3/0487 715/771 |
| 2014/0244782 A1 | 8/2014 | Beaurepaire et al. | |
| 2016/0070580 A1 | 3/2016 | Johnson et al. | |

FOREIGN PATENT DOCUMENTS

| | | |
|---|---|---|
| WO | 2013171487 A1 | 11/2013 |
| WO | 2014038918 A1 | 3/2014 |

OTHER PUBLICATIONS

"Chromecast", Retrieved on: Jul. 7, 2014, pp. 6 Available at: http://www.google.com/intl/en/chrome/devices/chromecast/.
"What is Ubuntu for Android?", Retrieved on: Jul. 7, 2014, pp. 9 Available at: http://www.ubuntu.com/phone/ubuntu-for-android.
Reply Written Opinion cited in PCT Application No. PCT/US2015/050664 dated Jun. 22, 2016, 5 pgs.
Reply Written Opinion cited in PCT Application No. PCT/US2015/050690 dated Apr. 8, 2016, 8 pgs.
Second Written Opinion cited in PCT Application No. PCT/US2015/050690 dated May 27, 2016, 4 pgs.
Reply Written Opinion cited in PCT Application No. PCT/US2015/050838 dated Jun. 24, 2016, 23 pgs.
Reply Written Opinion cited in PCT Application No. PCT/US2015/080846 dated May 19, 2016, 25 pgs.
Reply Written Opinion cited in PCT Application No. PCT/US2015/050866 dated May 2, 2016, 20 pgs.
Reply Written Opinion cited in PCT Application No. PCT/US2015/051133 dated Jul. 22, 2016, 24 pgs.
Non-Final Office Action cited in U.S. Appl. No. 14/495,443 dated Aug. 26, 2016, 44 pgs.
Int. Search Report/Written Opinion cited in PCT Application No. PCT/US2015/050664 dated Nov. 27, 2015, 13 pgs.
Int. Search Report/Written Opinion cited in PCT Application No. PCT/US2015/050690 dated Nov. 25, 2015, 10 pgs.
Int. Search Report/Written Opinion cited in PCT Application No. PCT/US2015/050838 dated Jan. 13, 2016, 14 pgs.
Int. Search Report/Written Opinion cited in PCT Application No. PCT/US2015/050846 dated Jan. 5, 2016, 12 pgs.
Int. Search Report/Written Opinion cited in PCT Application No. PCT/US2015/050866 dated Jan. 8, 2016, 14 pgs.
Int. Search Report/Written Opinion cited in PCT Application No. PCT/US2015/051133 dated Jan. 13, 2016, 14 pgs.
"Google I/O 2014: Android Takes the L", Jun. 25, 2014, reprinted from the Internet at: http://winsupersite.com/mobile-devices/google-io-2014-android-takes-l, 11 pgs.
"Considering CarPlay", Mar. 5, 2014, reprinted from the Internet at: http://getwired.com/2014/03/05/considering-carplay/, 4 pgs.
"Holy Smartphones and Tablets, Batman! Mobile Interaction's Dynamic Duo", Tommaso Piazza, Morten Fjelt, Gonzalo Ramos Asimevren Yantac and Shengdong Zhao, Sep. 24, 2013, in Proceedings of the 11th Asia Pacific Conference on Computer Human interaction, reprinted from the Internet at: http://t2i.se/wp-content/uploads/2014/01/APCHI_2013_v20.pdf, pp. 63-72.
"Multiple TV remotes showcase the evils of complexity. Smart TVs just make it worse", Jan. 13, 2014, reprinted from the Internet at: http://praxtime.com/2014/01/13/multiple-remotes-evil/, 4 pgs.
"Bimodal tablets (Windows and Android)", Jan. 14, 2005, reprinted from the Internet at: http://getwired.com/2014/01/05/bimodal-tablets-windows-and-android-remember-them-when-theyre-gone-again/, 23 pgs.
"MobiToss: A Novel gesture based interface for creating and sharing mobile multimedia art on large public displays", Jurgen Scheible, Timo Ojala and Paul Coulton, Oct. 26, 2008, in Proceedings of Multimedia, reprinted from the Internet at: http://www.mediateam.oulu.fi/publications/pdf/1131.pdf, pp. 957-960.
"Throw and Tilt—Seamless Interaction across Devices Using Mobile Phone Gestures", Raimund Dachselt and Robert Buchholz,

(56) References Cited

OTHER PUBLICATIONS

Sep. 22, 2008, in Proceedings of 2nd Workshop on Mobile and embedded Interactive Systems, reprinted from the Internet at: https://imld.de/cnt/uploads/2008-MEIS-Throw-and-Tilt.pdf, pp. 272-278.
"Up close with iOS 5: New gestures", Alexandra Chang, Oct. 14, 2011, reprinted from the Internet at: http://www.macworld.com/article/1163019/ios_5_new_gestures.html, 5 pgs.
"In-Car Entertainment using Mobile Devices: A study on Automotive Manufactures in India", S. Solamalai and Dr. N.R.V. Prabhu, Jun. 30, 2014, in International journal of Engineering Science and Technology, vol. 2, No. 1, reprinted from the Internet at: http://www.estij.org/papers/vol2no12012/4vol2no1/pdf., pp. 26-29.
"Google Chromecast controls TV from smartphones, tablets, laptops", Jul. 24, 2013, reprinted from the Internet at: http://www.computerworld.com/article/2484298/tablets/google-chromecast-controls-tv-from-smartphones—tablets—laptops.html, 5 pgs.
"Kyocera's Echo phone bring dual-screens and "Simul-Taking" to Spring", Davindra Hardawar, Feb. 8, 2011, reprinted from the Internet at: http://venturebeat.com/2011/02/08/kyocera-echo/, 4 pgs.
"Design A for P2", Jan. 15, 2013, reprinted from the Internet at: http://boards.openpandora.org/topic/11608-design-a-for-p2, 6 pgs.
"OSX Mavericks Preview: Multiple displays finally Work Like they're supposed to", Peter Cohen, Jul. 8, 2013, reprinted from the Internet at: http://www.imore.com/os-x-mavericks-preview-multiple-displays, 8 pgs.
"Separate Back Stack for each tab in Android using Fragments", May 18, 2013, reprinted from the Internet at: http://stackoverflow.com/questions/6987334/separate-back-stack-for-each-tab-in-android-using-fragments, 15 pgs.
"Spring Echo—Dual-Screen Simul-tasking Phone", Feb. 10, 2011, reprinted from the Internet at: http://www.unp.me/f106/sprint-echo-dual-screen-simul-tasking-phone-139170/, 3 pgs.
"Creating Separate Back Stacks for Android Application Tabs using Fragments", Apr. 30, 2013, reprinted from the Internet at: http://www.abtosoftware.com/blog/creating-separate-back-stacks-for-android-apps-tabs-using-fragmentsm, 3 pgs.
"Providing Proper Back Navigation", May 18, 2013, reprinted from the Internet at: http://developer.android.com/training/implementing-navigation/temporal.html, 4 pgs.
"Building for Multiple Screens", Oct. 18, 2013, reprinted from the Internet at: http://tech.infospace.com/2013/10/18/building-for-multiple-screens/, 5 pgs.
"User Interfaces When and Where They are Needed: An Infrastructure for Recombinant Computing", Mark W. Newman, Shahram Izadi, W. Keith Edwards, Jana Z. Sedivy and Trevor F. Smith, Oct. 27, 2002, in Proceedings of the 15th Annual ACM Symposium on User Interface Software and Technology, vol. 4, Issue 2, reprinted from the Internet at: http://mwnewman.people.si.umich.edu/pubs/uist2002-controllers.pdf, pp. 171-180.
"Multimodal user interfaces for context-aware mobile applications", Ralf Kernchen, Peter Pal Boda, Klaus Moessner, Bernd Mrohs, Matthieu Boussard and Giovanni Giuliani, Sep. 11, 2005, in IEEE 16th International Symposium on Personal, Indoor and Mobile Radio Communications, vol. 4, reprinted from the Internet at: ieeexplore.ieee.org/stamp/stamp.jsp?tp=&arnumber=1651849, 6 pgs.
"Stanford Interactive Workspaces: A Framework for Physical and Graphical User Interface Prototyping", Jan Borchers, Meredity Ringel, Joshua Tyler and Armando Fox, Dec. 2012, in IEEE Wireless Communication, reprinted from the Internet at: https://hci.stanford.edu/publications/2002/iwork_prototype_ieee/iRoom_SmartHomes_final.pdf, 7 pgs.
"Managing Context Information in Mobile Devices", Panu Korpipaa, Jani Mantyjarvi, Juha Kela, Heikki Keranen and Esko-Juhani Malm, Jul. 1, 2013, IEEE Pervasive Computing vol. 3, Issue 2, reprinted from the Internet at: http://140.127.22.92/download/learn_web/Tong(93-2)—Distribution_multimedia/database/6-7/Managing Context Information in Mobile Devices.pdf, pp. 42-51.
"Implicit Human Computer Interaction Through Context", Albrecht Schmidt, Jan. 1, 2000, personal Technologies, vol. 4, No. 2-3, 10 pgs.
"Design of human-centric adaptive multimodal interfaces", J. Kong, W.Y. Zhang, N. Yu and X.J. Xia, Jul. 28, 2011, International Journal of Human-Computer Studies, Academic Press, New York, N.Y., vol. 69, No. 12, 16 pgs.
"A Unifying Reference Framework for multi-target user interfaces", Gaelle Calvary, Joelle Coutaz, David Thevenin, Quentin Limbourg, Laurent Bouillon and Jean Vanderdoncki, Jun. 2003, Interacting with Computers, vol. 15, No. 3, pp. 289-308.
"Virtual Projection: Exploring Optical Projection as a Metaphor for Multi-Device Interaction", Dominikus Baur, Sebastian Boring and Steven Feiner, May 5, 2012, Proceedings of the SIGCHI Conference on Human Factors in Computing Systems, pp. 1693-1702.
"Extending Mobile Interfaces with External Screens", Julian Seifert, Dennis Schneider and Enrico Rukzio, Sep. 2, 2013, in Proceedings of International Federation for Information Processing, reprinted from the Internet at: https://www.uni-ulm.de/fileadmin/website_uni_ulm/iui.inst.100/institut/Papers/Prof_Rukzio/2013/2013-Seifert-et-al_ExtendingMobileInterfaces.pdf, 8 pgs.
"PDAs and Shared Public Displays: Making Personal Information Public, and Public Information Personal", Saul Greenberg, Michael Boyle and Jason Laberge, Jun. 30, 2014, in Proceedings of Personal Technologies, vol. 3, Issue 1-2, reprinted from the Internet at: http://grouplab.cpsc.ucalgary.ca/grouplab/uploads/Publications/Publications/1999-PDAs.PersonalTechnologies.pdf, pp. 54-64.
"Attach me, Detach me, Assemble me like You Work", Donatien Grolauz, Jean Vanderdonckt and Peter Van Roy, Sep. 12, 2005, in Proceedings of Human-Computer Interaction—INTERACT, reprinted from the Internet at: http://www.google.com/url?sa=t&rct=j&q=&esrc= s&source=web&cd=2&ved=0ahUKEwjkmdvYku7LAhWIQyYKHXCHCE8QFggmMAE&url=http%3A%2F%2Fwww.usixml.org %2Fservlet%2FRepository%2Fgrolaux-Interact2005.pdf%3FID%3D1413%26saveFile%3Dtrue&usg=AFQCNF5aeyzdblMNCmTIMQvIOuJ4rLECA, 14 pgs.
"A Cross-Device Interaction Style for Mobiles and Surfaces", Donomik Schmidt, Julian Seifert, Enrico Rukzio and Hans Gellersen, Jun. 11, 2012, in Proceedings of the Designing Interactive Systems Conference, reprinted from the Internet at: https://www.uni-ulm.de/fileadmin/website_uni_ulm/iui.inst.100/institut/Papers/Prof_Rukzio/2012-Schmidt-D-A-Cross-Device-Interaction-Style-for-Mobiles-and-Surfaces.pdf, pp. 318-327.
"SlingPlayer for Connected Devices", Jun. 25, 2014, reprinted from the Internet at: http://forms.sling.com/go/spcd, 3 pgs.
"Second Written Opinion Issued in PCT Application No. PCT/US2015/050838", Mailed Date: Sep. 6, 2016, 8 Pages.
"International Preliminary Report on Patentability Issued in PCT Application No. PCT/US2015/050838", Mailed Date: Dec. 12, 2016, 8 Pages.

* cited by examiner

VIEW MANAGEMENT ARCHITECTURE

BACKGROUND

Within the field of computing, many scenarios involve a presentation of applications of a computing environment through a set of at least two displays. For example, a first application comprising an email client may comprise a set of views for different messages, respectively presented as a movable window with an adjustable size and shape, and a second application comprising a media player may comprise a display region presented without user interface controls ("chrome"). Some applications may exhibit relationships (e.g., a first application and a second application that are used together, and/or some views of an application that exhibit a superior/subordinate relationship).

A user may choose to position the respective applications and views in various ways throughout the display set. For example, the views of the first application may be consolidated into one window or pane, consolidated on the first display, or distributed across the first display and the second display. The second application may be presented as a portion of one display; as a full-sized region that fills a display in a "maximized" mode; or as a region that spans at least a portion of two or more displays. The displays may also exhibit a logical arrangement (e.g., a first display may be logically positioned to the left of a second display, such that moving a pointer beyond the left edge of the second display causes it to appear on the first display and vice versa), and the logical arrangement may or may not correspond to a physical arrangement of the displays. To enable such interactions, the computing environment may represent the collection of displays as a two-dimensional coordinate space oriented around an origin, and may represent the position of each view as a set of coordinates within the display space.

The positioning of the views may also reflect a three-dimensional ordering, where some views are presented over other views. Among the displays, a particular application with which the user has recently interacted may comprise a "top" application in the ordering (e.g., the application associated with the latest user input from the user), such that user input from various input components is delivered to the "top" application. The user may also interact with the applications distributed across the displays in various ways, such as a "back-stack" that allows the user to transition the "top" application to a second-most-"top" application in the ordering, and/or an application switcher that allows the user to select any running application as the "top" application that receives user input. In this manner, the computing environment may present the applications to the user across a variety of displays and manage the routing of input according to a current input focus.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The representation of a set of displays as a unified coordinate space, and the views within as a region of such space, may exhibit some disadvantages. As a first such example, it may be difficult to manage the set of views as the number increases, particularly in view of interrelationships among views and applications. Adjusting layouts to views within the coordinate space while maintaining the may become difficult. As a second such example, while the presentation of a unified display space may exhibit some advantages, some limitations may also arise therefrom. For example, it may be desirable to present a particular display outside of the unified display space, e.g., as a distinct or "disjoint" display featuring a particular layout or presentation mode, but representations based on a unified coordinate space may not permit such representation. As a third such example, a unified coordinate space may enable some regions to span multiple displays, but this feature may not be appealing in some circumstances, and may increase the maintenance of the display space with options that are not of value to users.

Presented herein are techniques for representing a display space of a computing environment that may address some of these aspects of unified coordinate spaces. In accordance with these techniques, a device may enable a device to generate a user interface collection comprising, for respective displays, an arrangement of view entries for respective views presented on the display. Responsive to receiving a request to present an application on a selected display, the device may create, in the arrangement of view entries for the selected display, a new view entry representing a view of the application at a position on the selected display. The device may also, responsive to receiving a request to apply a layout to a selected display, apply the layout to the arrangement of the at least one view entry for the selected display. In this manner, the device may provide a view management architecture and framework that enable a more adaptable representation of the arrangement of views within the multi-display computing environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
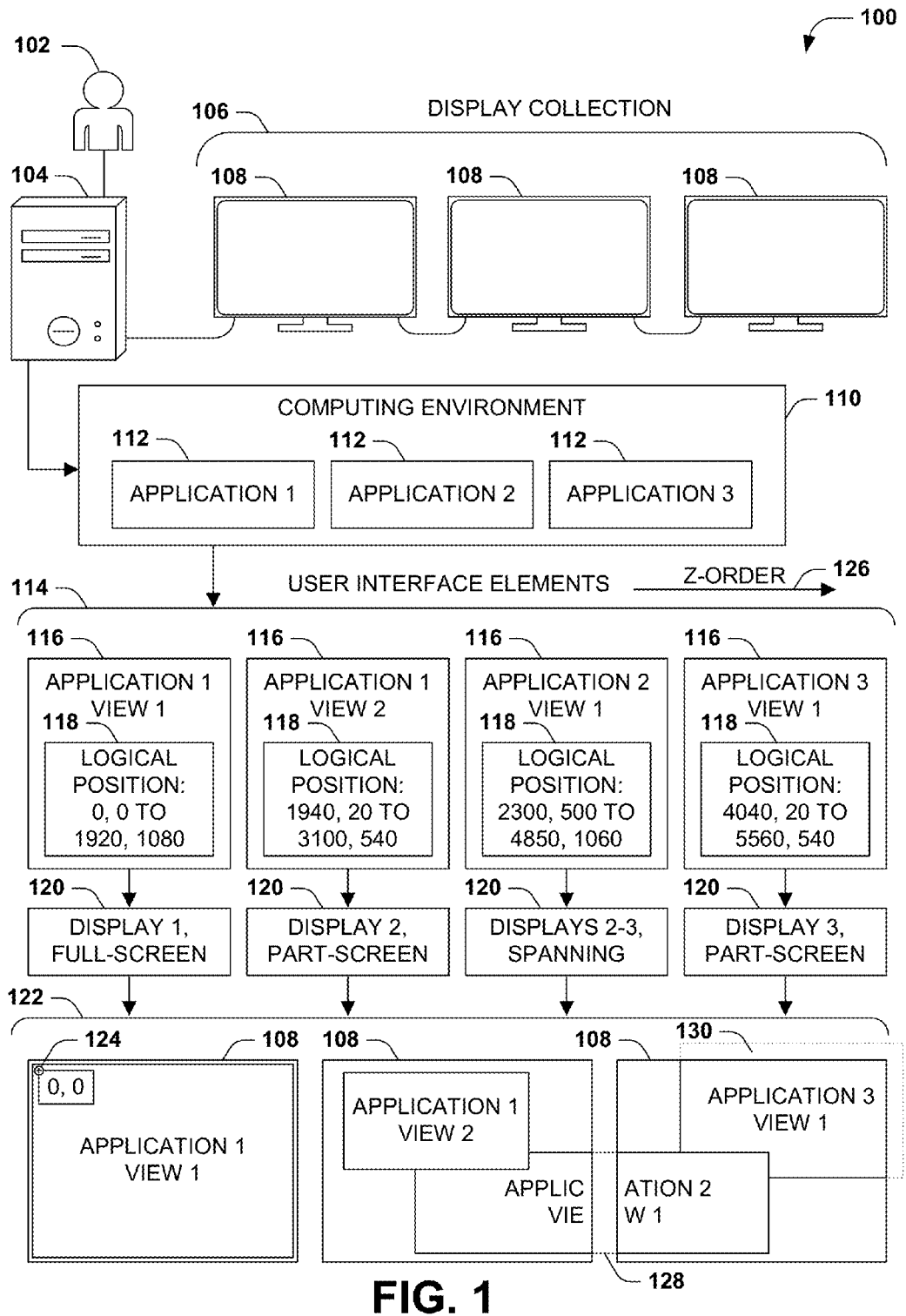
FIG. 1 is an illustration of an example scenario featuring a representation of application views of the applications of a computing environment of a multi-display device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario featuring a presentation of a computing environment 110 to a user 102 on a device 104 comprising a collection 106 of at least two displays 108. In this example scenario 100, the applications 112 of the computing environment 110 generate a set of views 116, such as windows, display regions, and "widgets," to be arranged and presented within a visual representation of the computing environment 110 across the display collection 106. The appearance and behavior of the respective views 116 may also vary in several respects, such as size, shape, aspect ratio, visual style, and the inclusion or exclusion of attached window management controls ("chrome"). The respective views 116 may also exhibit a visual ordering, such as a "z-order" wherein a first view 116 is to be depicted in front of a second view 116, and wherein a selected view 116 that is associated with an input focus of the computing environment is presented first in this ordering (the "topmost" view 116). Additionally, relationships may exist among the collection of views 116; e.g., an application 112 may feature several views 116 that are to be kept in close proximity.

To enable such aspects of the presentation of views 116, the computing environment 110 may provide a representation of a unified coordinate space 122, wherein the respective displays 108 are logically (and perhaps physically) arranged to display a logical range of coordinates within the unified coordinate space 122 relative to an origin 124. The respective views 116 may be represented by the device 104 as a collection 114 of coordinate regions 118 within the unified coordinate space 122, such as according to the coordinates of the upper-left and lower-right coordinates of a rectangular region. The realization of the coordinate regions 118 within the display collection 106 may be achieved as a mapping 120 from the unified coordinate space 122 to the logical ranges of coordinates of the respective displays 108. Such mapping 120 may result in a first view 116 spanning 128 the entirety of a particular display 108 (e.g., a full-screen or "maximized" view), and a second view 116 spanning multiple displays 108. Additionally, the representation of views 116 may be ordered and rendered in reverse order, such that views 116 that are earlier in the z-order 126 are drawn after, and thus on top of, views 116 that are later in the z-order 126, and the view 116 at the front of the z-order 126 is drawn last in order to present it as the "top-most" view 116. In this manner, the representation of the display collection 106 presenting a unified coordinate space 122 may provide While the representation of views 116 in the manner illustrated in the example scenario 100 of FIG. 1 may present some advantages, some limitations may also arise from this representation of the views 116 of the computing environment 110.

As a first such example, the rendering of displays 108 as a unified coordinate space 112 may be difficult to utilize with displays 108 of different physical and/or logical sizes that do not together form a rectangular space. Rather, portions of the unified coordinate space 112 may not be covered by the display collection 106, and may therefore represent a blind spot within the unified coordinate space 112; e.g., portions of views 116 that are positioned within such a missing region are not visible on any display 108.

As a second such example, the unified coordinate space 124 may result in part or all of a view 116 falling outside of the ranges of the displays 108 of the display collection 106. For example, a view 116 may be moved or resized such that a missing portion 130 of the user interface is outside of the logical range of the displays 106, and is therefore not visible. Such missing portions 130 may also arise due to changes in the displays 108 of the display collection 106 (e.g., reducing the resolution of a display space of a display 108, or removing a display 108 from the display collection 106). As a further problem, the controls for repositioning the view 116 that are attached to the logical region 118 may also be positioned outside of the viewable display space, and relocating the view 116 into the display space may be difficult.

As a third such example, the presentation of a logical region 118 of a view 116 spanning 128 multiple displays 108 may be conceptually interesting, but may in many cases be visually unappealing, as the physical separation of displays may introduce a gap in the user interface of the view 116. This gap may break words or images across displays 108, and the interruption may be exacerbated if the displays 108 are not physically adjacent, such that the view 108 is arbitrarily partitioned in non-intuitive ways.

As a fourth such example, this arrangement may complicate the management of the views 116. As a first such example, where an application 112 presents a set of related views 116 that are to be presented together, it may be difficult to maintain such relationships in an unordered collection 114. For example, while such views 116 are to be displayed together, it may not be clear how to apply this constraint when a view 116 is spanning 128 multiple displays 108. As a second such example, applying a layout to a display 108, such as a "full-screen" layout, may result in rendering only a portion of a view 112 that is spanning 128 multiple displays 108.

As a fifth such example, the representation of views 116 as a collection 114 distributed over the display collection 106 may not scale to a large number of displays 108 and views 116. For example, it may be limiting to constrain a large collection 114 of views 116 and displays 108 to a single input focus that is associated with the "top-most" view 116 in the z-order 126; i.e., it may be difficult to alter this model to enable different input devices, such as operated by different users, to interact concurrently with different views 116. Accordingly, this model may not scale well to presenting a variety of interactive applications 112 of a computing environment 110 to a variety of users 102. These and other limitations may arise within representations of a collection 114 of views 116 such as illustrated in the example scenario 100 of FIG. 1.

B. Presented Techniques

Presented herein are techniques for enabling devices 104 to present the views 116 of the applications 112 of a computing environment 110 in a manner that facilitate scalability to multi-display collections 106. In accordance with such techniques, rather than presenting a unified coordinate space 122, the display collection 106 may be organized as a set of "disjoint" displays 108, each presenting a distinct subset of the views 116 of the applications 112 of the computing environment 110.

Figure 2:
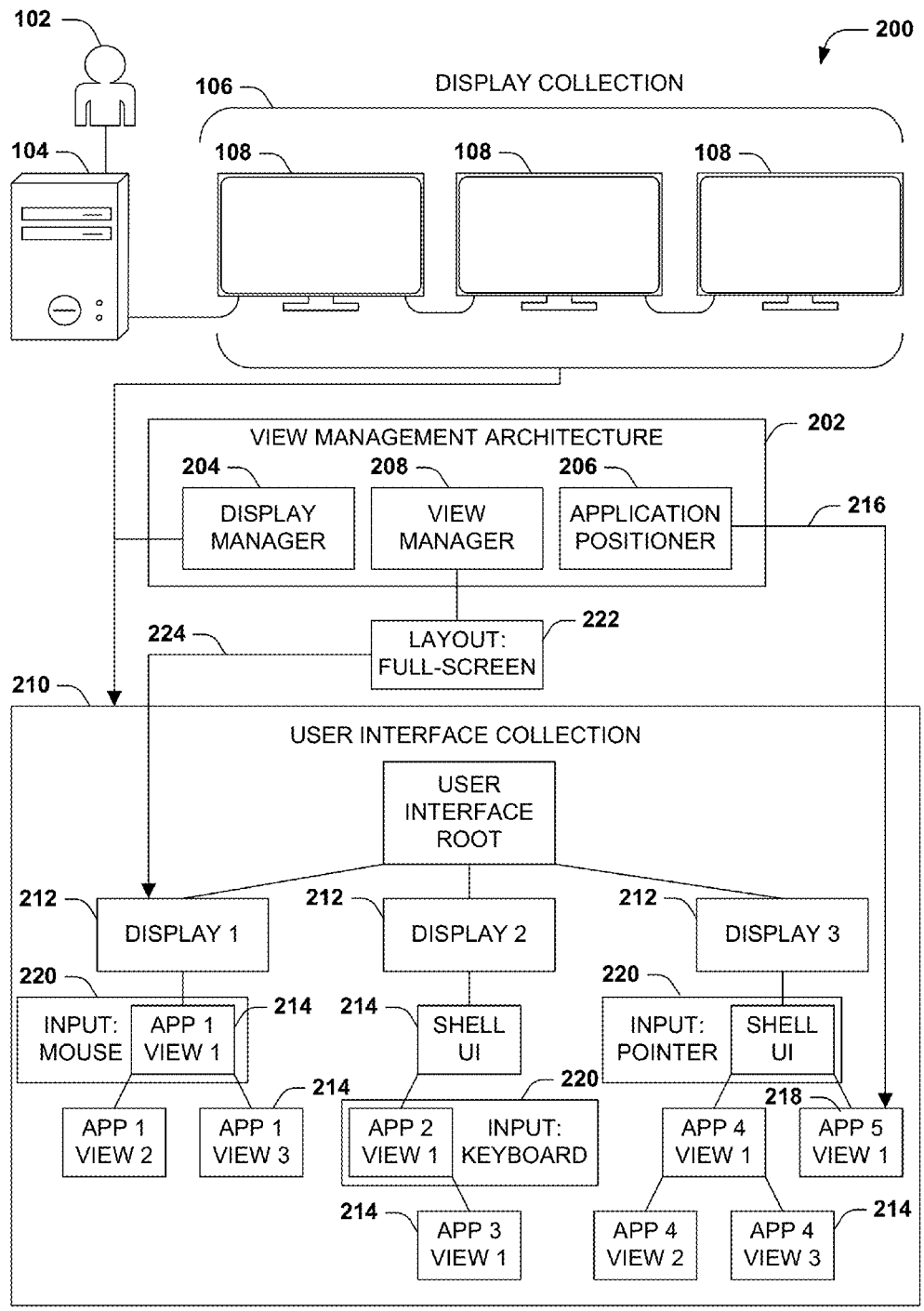
FIG. 2 is an illustration of an example scenario featuring a representation of application views of the applications of a computing environment of a multi-display device, in accordance with the techniques presented herein.

FIG. 2 is an illustration of an example scenario 200 involving a device 104 featuring a display collection 106 of displays 108 that together present the views 116 of applications 112 within a computing environment 110. In this example scenario 200, the views 116 are represented as a user interface collection 210, wherein each display 108 of the display collection 106 is represented as an arrangement 212 of view entries 214 for respective user interface elements presented on the display 108. Such user interface elements 214 may be organized, e.g., as a hierarchical structure such as a tree, in order to capture relationships between views 116 as part of the structure of the user interface collection 210.

The user interface collection 210 may be generated, maintained, and exposed to the computing environment 110 by a view management architecture 202. The view management architecture 202 may include a display manager 204, which generates the user interface collection 210 of the display collection 106 as an arrangement of view entries 214 for respective views presented on the respective displays 108 of the display collection 106. For example, the display manager 204 may enumerate the displays 108 of the display collection 106, and may handle such requests as the additional or removal of a display 108. The view management architecture 202 may also include an application positioner 206, which, responsive to receiving a request to present an application 108 on a selected display 108, creates, in the arrangement 212 of view entries 214 for the selected display 108, a new view entry 218 representing a view 116 of the application 112 at a position on the selected display 108. The view management architecture 202 may also include a view manager 208, which, responsive to receiving a request to apply a layout 222 to a selected display 108, applies 224 the layout 222 to the arrangement 212 of view entries 214 for the selected display 108. In this manner, the view management architecture 202 may represent the presentation of the views 116 of the applications 112 of the computing environment 110 through the display collection 106 in accordance with the techniques presented herein.

The presentation of the views 116 of the applications 112 in this manner may avoid some limitations of other techniques, such as those apparent from the example scenario 100 of FIG. 1. As a first such example, the organization of the views 116 into discrete arrangements 212 for the respective displays 108 may reduce some difficulties arising with spanning 128 of displays 108, including the unappealing visual appearance and the difficulty of maintaining logical relationships thereamong. As a second such example, the representation may facilitate applying a layout 22 to a display 212, as the structure of the user interface collection 210 may consolidate the views 214 of the display 108 to which the layout 222 is to be applied. As a third such example, the representation may facilitate the binding of user input to respective views 214; e.g., respective input devices may participate in a binding 220 to a particular view 114 within the user interface collection 210, without necessarily depending upon a z-order 126 that establishes only a single top-most view 116 as the sole input focus. As a fourth such example, the avoidance of a dependency on a unified coordinate space 122 may reduce the appearance of blind spots and/or missing portions 130 when used with a display collection 106 of differently sized displays 108. As a fifth such example, the discrete representation of views 214 on respective displays 108 may enable the user interface collection 210 to scale more efficiently to handle a large number of displays 108 and/or views 116, as adjustments to a particular display 108 and/or view 116, such as applying a layout 22, may be achieved by adjusting only the view entries 214 within the arrangement 212 for the selected display 108. These and other features may be achievable through the representation of applications 112 and views 116 through the user interface collection 210 and view management architecture 202 according to the techniques presented herein.

C. Technical Effects

The use of the techniques presented herein to present the primary computing environment 204 to the user 102 through the display collection 106 may, in some embodiments, result in a variety of technical effects.

As a first technical effect that may be achievable through the techniques presented herein, the representation of the views 116 of a computing environment 110 as provided herein may provide a more coherent user experience for the user 102 by reducing visual issues arising within the computing environment 110, such as blind spots in the uniform coordinate space 122 caused by a non-rectangular arrangement of rectangular displays 108; missing portions 130 of user interfaces that are positioned outside of the displayed space; difficulties repositioning a view 116 due to the off-screen positioning of region management controls; and spanning 128 across displays 108 that creates visual artifacts. A disjoint presentation, where each display 108 presents views 112 within the displayed space, may reduce such issues and provide a more usable computing environment 110.

As a second technical effect that may be achievable through the techniques presented herein, the representation of the views 116 of a computing environment 110 as provided herein may reduce inconsistencies. As a first such example, it may easier to apply a z-order among the views 116 of a particular display 108, than to views 116 throughout and potentially spanning multiple displays 108. As a second such example, maintaining relationships among applications 112 and views 116, such as maintaining a close proximity of related items within the display collection 106, may be easier, as the view entries 214 may be stored together within an arrangement 212.

As a third technical effect that may be achievable through the techniques presented herein, the representation of the views 116 of a computing environment 110 as provided herein may facilitate the management of the user interface collection 210 of the computing environment 106. As a first such example, if the view entries 214 are consolidated into the arrangements 212 of the respective displays 108, the application of a layout 222 to the display 108 may be achieved only by adjusting the positions of the view entries 214 within the arrangement 212 of the display 108, without having to identify the views 116 that may be affected by the layout 222, including views 116 spanning 128 part or all of a particular display 108. As a second such example, scaling the computing environment 110 to include a large number of applications 112, views 116, and/or displays 108 may be more feasible if the views 116 are associated with a particular display 108, rather than having to perform such determination among a potentially large set of elements. As a third such example, binding 220 an input component to a particular view 116 may be achieved by associating the input component with the view entry 214 for the view 116. Such an organization may enable concurrent binding 220 of different input components to different views 116. These and other technical effects may be achievable through various implementations of the techniques presented herein.

D. Example Embodiments

Figure 3:
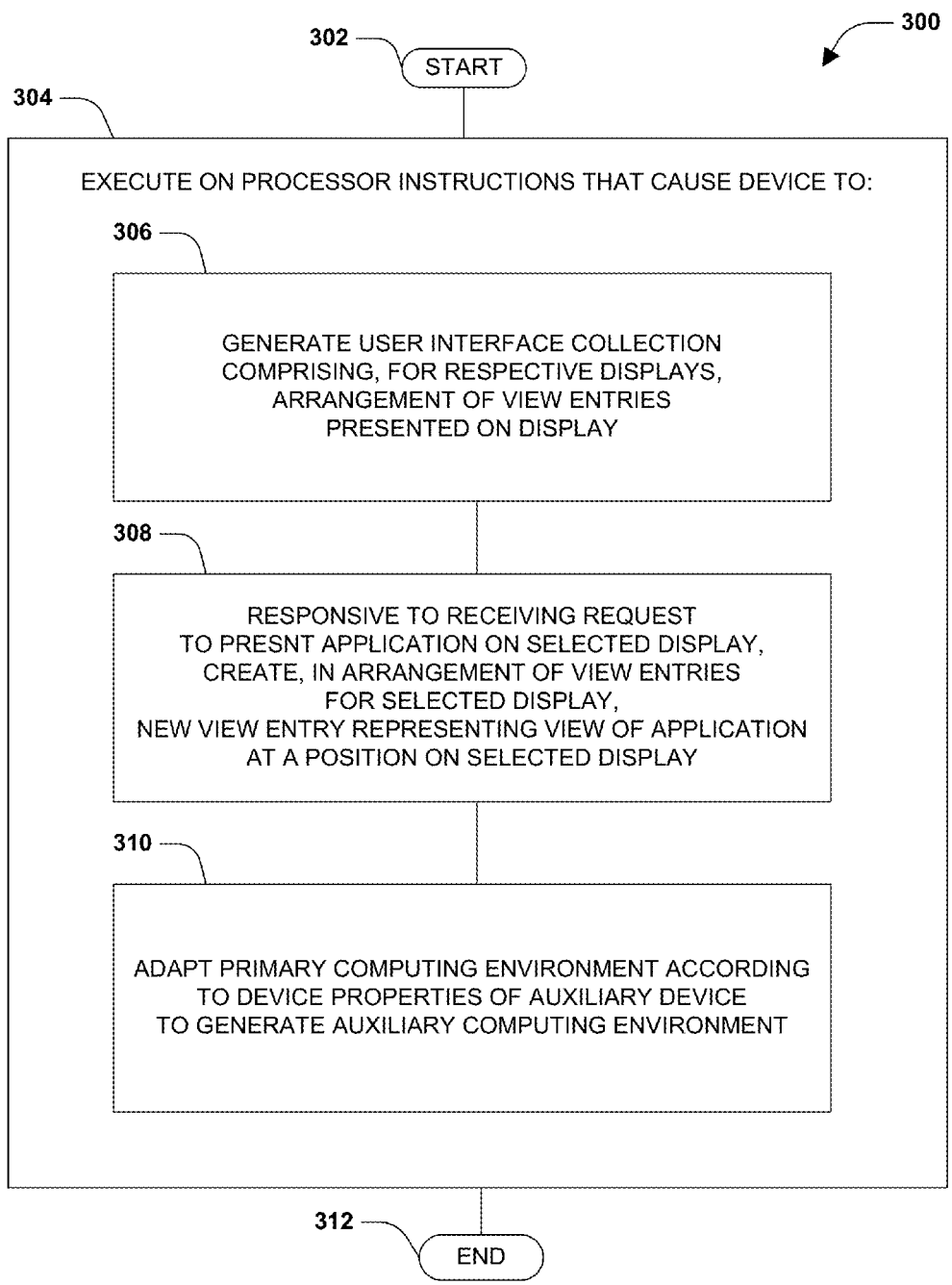
FIG. 3 is a flow diagram of an example method of presenting a computing environment of a multi-display device, in accordance with the techniques presented herein.

FIG. 3 presents a first example embodiment of the techniques presented herein, illustrated as an example method 300 of presenting a computing environment 110 to a user 102 of a device 104 comprising a display collection 106 of at least two displays 108. The example method 300 may be implemented, e.g., as a set of instructions stored in a memory component of the device 104, such as a memory circuit, a platter of a hard disk drive, a solid-state storage device, or a magnetic or optical disc, and organized such that, when executed on a processor of the device, cause the device 104 to operate according to the techniques presented herein.

The example method 300 begins at 302 and involves executing 304 the instructions on a processor of the device 104. Specifically, executing 304 the instructions on the processor causes the device 104 to generate 306 a user interface collection 210 comprising, for respective displays 108, an arrangement 212 of view entries 214 for respective views 116 presented on the display 108. Executing 304 the instructions on the processor also causes the device 104 to, responsive to receiving a request to present an application 112 on a selected display 108, create 308, in the arrangement 212 of view entries 214 for the selected display 108, a new view entry 214 representing a view 116 of the application 112 at a position on the selected display 108. Executing 304 the instructions also causes the device 104 to, responsive to receiving a request to apply a layout 222 to a selected display 108, apply 310 the layout 222 to the arrangement 212 of the at least one view entry 214 for the selected display 108. In this manner, the instructions cause the device 104 to present the computing environment 110 to the user 102 through the device 104 in accordance with the techniques presented herein, and so ends at 312.

Figure 4:
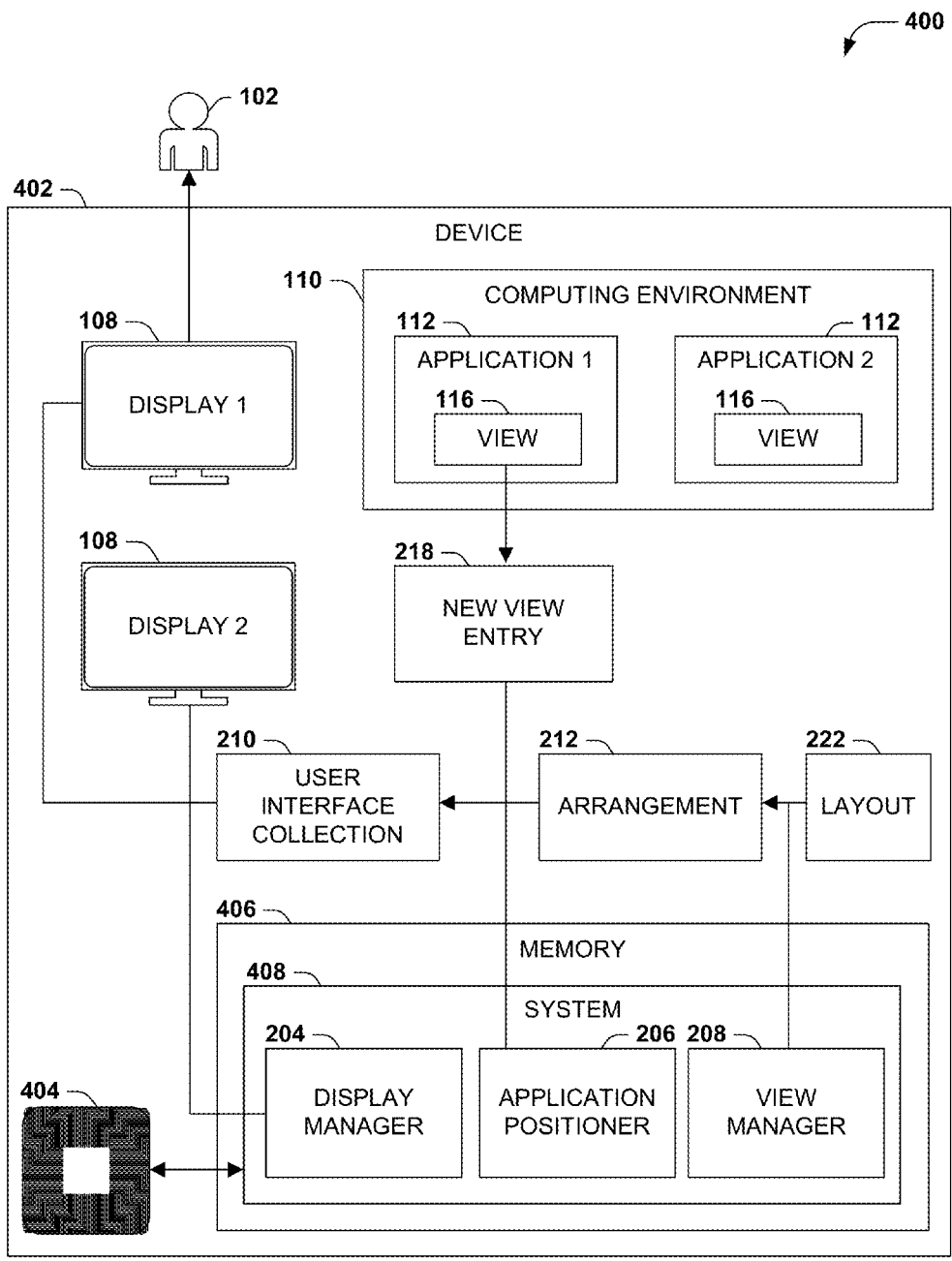
FIG. 4 is a component block diagram of example multi-display device featuring a system that presents application views of a computing environment, in accordance with the techniques presented herein.

FIG. 4 presents a second example embodiment of the techniques presented herein, illustrated as an example system 410 implemented on an example device 402 comprising a display collection 106 of at least two displays 108. The example device 402 hosts and/or manages a computing environment 110 comprising a set of applications 112 that are presented within the computing environment 110 as one or more views 116. The example device 402 further includes a processor 404 and a memory 406 where an example system causes respective example device to present a computing environment to a user 102 in accordance with the techniques presented herein. The respective example systems may be implemented, e.g., as a set of components respectively comprising a set of instructions stored in the memory 408 of the respective example devices, where the instructions of respective components, when executed on the processor 406, cause the example device to operate in accordance with the techniques presented herein. Alternatively, the respective components may be implemented as a discrete circuit or hardware device, or a combination thereof, that operate in accordance with the techniques presented herein.

The example system 408 includes a display manager 204, which generates in the memory 406 a user interface collection 210 comprising, for respective displays 108, an arrangement 212 of view entries 214 for respective views 116 presented on the display 108. The example system 408 also includes an application positioner 206, which, responsive to receiving a request to present an application 108 on a selected display 106, creates, in the arrangement 212 of view entries 214 for the selected display 108, a new view entry 218 representing a view 116 of the application 112 at a position on the selected display 108. The example system 408 also includes a view manager 208, which, responsive to receiving a request to apply a layout 222 to a selected display 108, applies the layout 108 to the arrangement 212 of the at least one view entry 214 for the selected display 108. In this manner, the example system 408 enables the example device 402 to present the computing environment 110 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
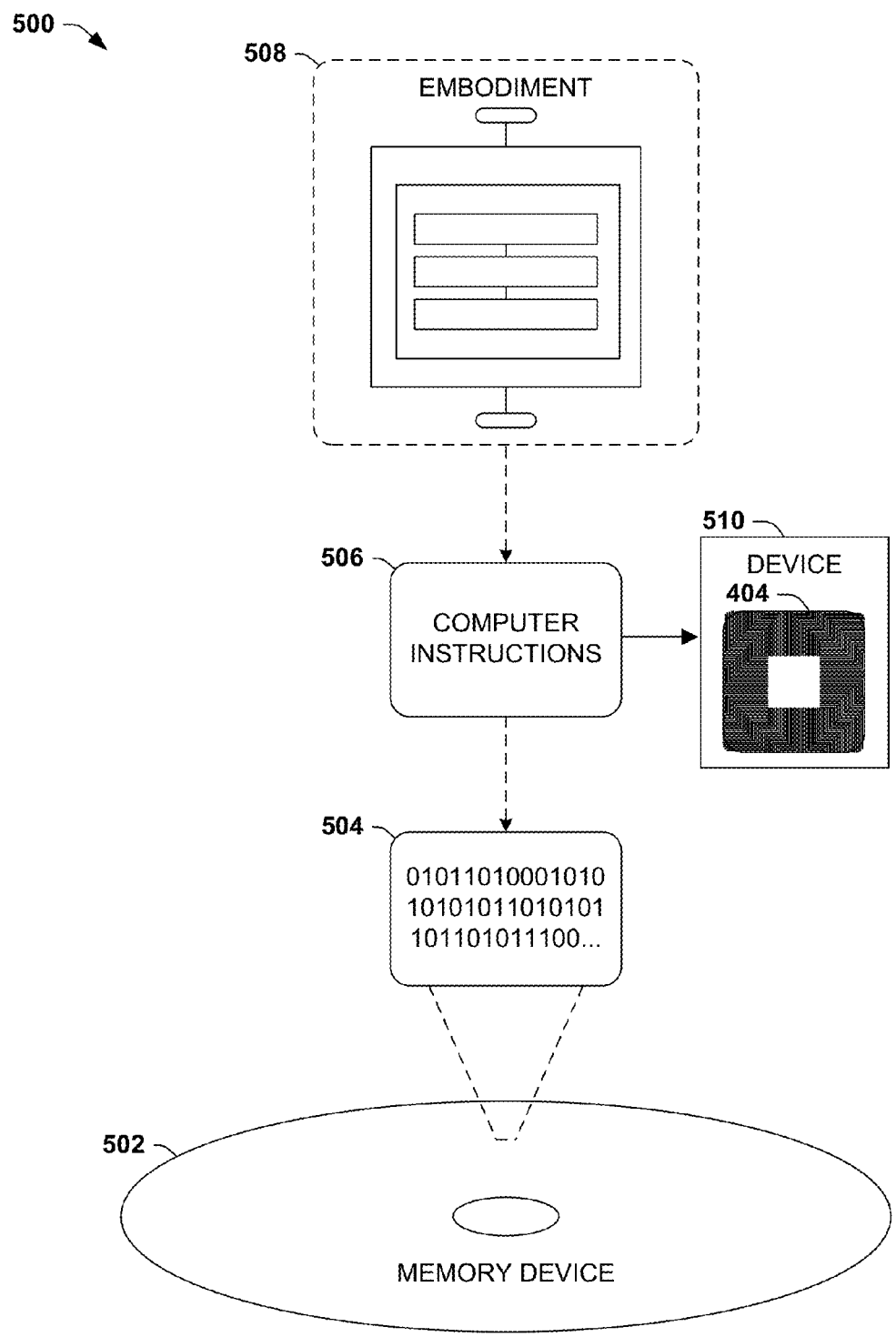
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510, cause the device 510 to operate according to the principles set forth herein. In a first such embodiment, the processor-executable instructions 506 may cause a device to present a computing environment 110 to a user 102 through at least two displays 108, such as the example method 300 of FIG. 3. In a third such embodiment, the processor-executable instructions 506 may cause a device to implement a system for presenting a computing environment to a user 102, such as the example system 408 presented in the example scenario 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example system 408 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 104, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with a variety of applications 112 presented within the computing environment 110 of the device 104, such as office productivity applications; media presenting applications, such as audio and video players; communications applications, such as web browsers, email clients, chat clients, and voice over IP (VoIP) clients; navigation applications, such as geolocation, mapping, and routing applications; utilities, such as weather and news monitoring applications that present alerts to the user 102; and games. Moreover, the applications 112 of the computing environments 110 may involve a presentation of content through one or more presentation modalities, such as text, images, live and/or prerecorded video, sound effects, music, speech, tactile feedback, three-dimensional rendering, and interactive and/or non-interactive user interfaces, as well as various techniques for receiving user input from the user 102, such as text input, pointing input, tactile input, gestural input, verbal input, and gaze tracking input.

As a third variation of this first aspect, the techniques presented herein may be utilized with a variety of architectures involving the device 104. As a first such example, the device 104 may also be part of a device collection (e.g., a mobile phone, a workstation, and a home theater computer of the user 102), and various displays 108 and other components may be provided on other devices 104 of the device collection. As a second such example, the device 104 may utilize components that are directly and physically connected to each such device, such as wired displays, speakers, and headphones. As a third such example, the device 104 may utilize one more components that are accessible via a wireless connection, such as a radiofrequency. As a fourth such example, the device 104 may communicate with other devices over a personal-area, local-area, and/or wide-area network in order to interoperate according to the techniques presented herein. As a fifth such example, the device 104 may utilize one or more components that are accessible through another device of the device collection, such as in a client/server or peer-to-peer architecture. Moreover, the device 104 may be utilized by one user 102 or by a group of users 102, and/or may be controlled by at least one first user 102 on behalf of at least one second user 102. These and other scenarios may be suitable for the presentation of a computing environment 110 through the device 104 in accordance with the techniques presented herein.

E2. User Interface Collection

A second aspect that may vary among embodiments of the techniques presented herein involves the organization of the user interface collection 210 as a set of arrangements 212 of view entries 214 for respective displays 108.

As a first variation of this second aspect, the user interface collection 210 may be structured in a variety of ways. One such example is illustrated in the example scenario 200 of FIG. 2, wherein the arrangement 212 of view entries 214 further comprises a user interface element tree, comprising a root node that may have parent-child relationships with other nodes, and where the tree structure establishes a hierarchy of nodes that may facilitate the rendering of views 116 on the display 108 (e.g., rendering the nodes of the arrangement 212 in a bottom-up recursive manner in order to exhibit a z-ordered presentation). A view may be added to a display 108 by inserting the new view entry 218 into the subtree of the node providing the tree root of the arrangement 212 of the user interface element tree.

As a second variation of this second aspect, within the structure of the user interface collection 210, relationships among view entries 214 may be represented in a variety of ways. As one such example, the respective applications 112 within the computing environment 110 may be represented in the user interface collection as an application container that encapsulates the view entries 214 of respective views of the application 112. Such encapsulation may facilitate the management of the user interface collection 210; e.g., moving an application 112 within the computing environment 110 (e.g., from a first display 108 to a second display 108 by moving the application container that encapsulates the view entries 214 of the application 112 from the arrangement 212 for the first display 108 to the arrangement 212 for the second display 108, or by relocating an application 112 within the z-order 126 of a particular display 108) may be achieved by moving the application container that encapsulates the view entries 214 of the application 112 (e.g., relocating the node for the application container within a tree organization of the user interface collection 210). A new view 116 for the application 112 may be added to the computing environment 110 by creating the new view entry 218 within the application container for the application 112.

As a third variation of this second aspect, the user interface collection 210 may facilitate the maintenance of relationships among applications 112 and/or views 116 that are to be presented together. For example, where a first application 112 is associated with a related application 112 within the computing environment 110, the device 104 may fulfill a request to move the first application 112 from a first display 108 to a second display 108 by moving both the application container for the first application 112 and the application container encapsulating the view entries 212 of the related application 108 from the arrangement 212 for the first display 108 to the arrangement 212 for the second display 212.

As a fourth variation of this second aspect, the device 104 may also utilize the user interface collection 210 to represent and organize views 116 that are associated with a user interface shell of the computing environment 110, and not with any particular application 112. Such elements of the user interface shell may include, e.g., taskbars, menu bars, application docks, notification areas, system alert messages, and control panels. As one such example, a shell chrome manager may be provided that, responsive to receiving a request to create a shell user interface element on a selected display 108, creates a shell view entry that represents the shell user interface element at a position on the selected display 108, and insert the shell view entry into the arrangement 212 of view entries 214 for the selected display 108. As a particular example, a selected shell view entry may further comprise a spacing element positioned between a first view 116 and a second view 116, such as a visual divider of the display 108. Responsive to adjusting a position of the first view 116 on a selected display 108, an application positioner 206 may also adjust the position of the spacing element according to the positions of the first view 116 and the second view 116.

As a fifth variation of this second aspect, the user interface collection 210 may permit a view 116 of an application 112 to span two or more displays 108, but may do so by representing each portion of the view 116 as a view entry 214 within the arrangement 212 of a particular display 108. For example, a shell chrome manager may receive a request to create a shell user interface element that spans at least two displays 108 (e.g., a taskbar that horizontally spans multiple displays 108), and may create, a shell view entry representing the shell user interface element within the arrangement 212 of each such display 108.

Figure 6:
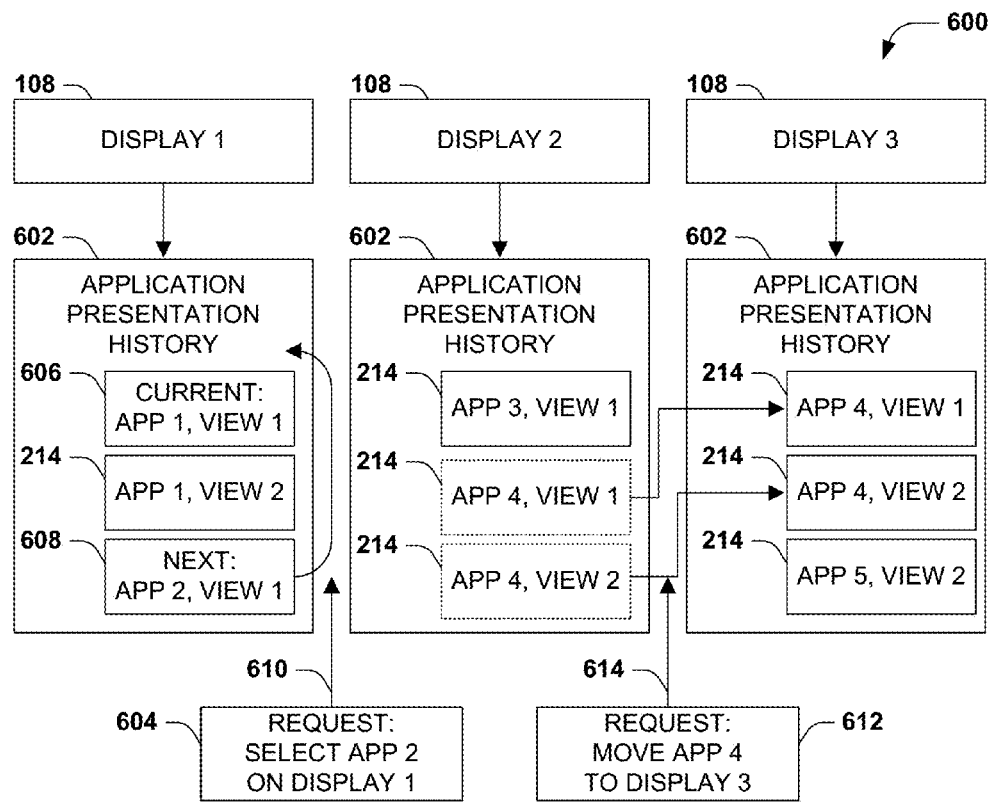
FIG. 6 is an illustration of an example scenario featuring the provision of an application presentation history to manage a history of application presentations within a computing environment, in accordance with the techniques presented herein.

FIG. 6 presents an illustration of an example scenario 600 featuring a sixth variation of this second aspect, wherein the user interface collection 210 includes, for each display 108, an application presentation history 602 representing a history of the applications 112 and views 116 that have been presented on the display 108, including a current view 606 that is topmost or has an input focus of the computing environment 110. The inclusion of an application presentation history 602 may facilitate the switching and selection among the applications 112 and views 116 presented on the display 108. As a first such example, responsive to receiving a request 604 to transition from the current view 606 to a next view 608 for a selected display 108 (e.g., according to a z-order 126 of the applications 112 and/or views 116), the device 104 may record 610 the next view 608 as the new current view 606 in the application presentation history 602 for the selected display 108. The device 104 may also rearrange the view entry 214 of the next view 608 above the current view 606 within the arrangement 212 of view entries 214 of the user interface collection 210 for the selected display 108. As a second such example, the device 104 may include an application switcher that, responsive to receiving a request to present a list of views 116 that are presented on a selected display 108, presents the application presentation history 602 of the views 116 for the selected display 108; and responsive to receiving a selection of an application 112 and/or view 116 from the application presentation history 602, invokes the application transitioner to select the selected view as the current view 606. As a third such example, upon receiving a request 612 to move an application 112 from a second display 108 to a third display 108, the device 104 may move 614 the view entries 214 for the views 116 of the selected application 112 from the application presentation history 602 of the second display 108 to the application presentation history 602 of the third display 108 (e.g., recording such views 116 as the topmost views 116 for the third display 108), as well as rearranging the view entries 214 within the arrangements 212 of the respective displays 108. In this manner, the device 104 may represent, generate, and manage the user interface collection 210 in accordance with the techniques presented herein.

E3. Layouts

A third aspect that may vary among embodiments relates to the application of a layout 222 to a display 108 of the computing environment 110. For example, the representation of the user interface collection 210 may enable the adjustment of an arrangement 212 of view entries 214 to exhibit a variety of visual configurations.

As a first variation of this third aspect, a request to apply a layout 222 to a selected display 108 may be achieved by adjusting the positions of the views 116 recorded in the view entries 214 of the arrangement 212 for the selected display 108, and/or rearranging the view entries 214 within the arrangement 212 (e.g., as an adjustment of the z-order 126 of the selected display 108). As a further variation, the device 104 may maintain the layout 222 applied to the display 108; e.g., responsive to moving a view 116 of an application 112 in the arrangement 212 of view entries 214 for a selected display 108, the device 104 may also adjust the layout 222 for the selected display 108 (e.g., while a first application 112 is presented on the display 108 using a full-screen layout 222, the movement of a second application 112 to the same display 108 may cause an adjustment of the layout 222 to reflect a side-by-side or z-ordered presentation of the views 116 of the applications 112).

Figure 7:
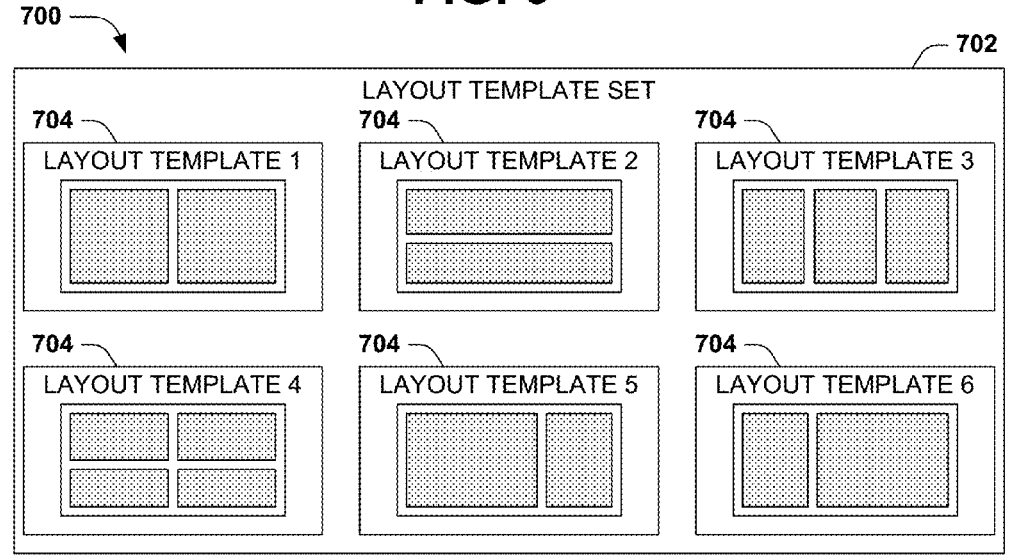
FIG. 7 is an illustration of an example scenario featuring a set of layout templates that may be applied to the application views of a computing environment of a multi-display device, in accordance with the techniques presented herein.

FIG. 7 presents an illustration of an example scenario 700 wherein the respective layouts 222 are presented as a layout template set 702, comprising a set of layout templates 704 that may be applied to the views 116 presented on a display 108. Responsive to receiving a request to present the layout template set 702, the device 104 may present the layout template set 702 to the user 102; and responsive to receiving a selection of a selected layout template 704 to be applied to a selected display 108, the device 104 may apply the selected layout template 704 to the selected display 108. In a further variation, the device 104 may permit a user 102 and/or application 112 to define new layout templates 704; e.g., responsive to receiving a request to store a new layout template 704 in the layout template set 702, the device 104 may store the new layout template 704 in the layout template set 702, which may enable a further application of the layout template 704 to other displays 108. Many such variations in the application of templates 222 to the arrangements 212 of view entries 214 for the respective displays 108 may be included in embodiments of the techniques presented herein.

E4. Component Integration

A fourth aspect that may vary among embodiments of the techniques presented herein involves the manner of integrating various components of the computing environment 110 with the user interface collection 212.

Figure 8:
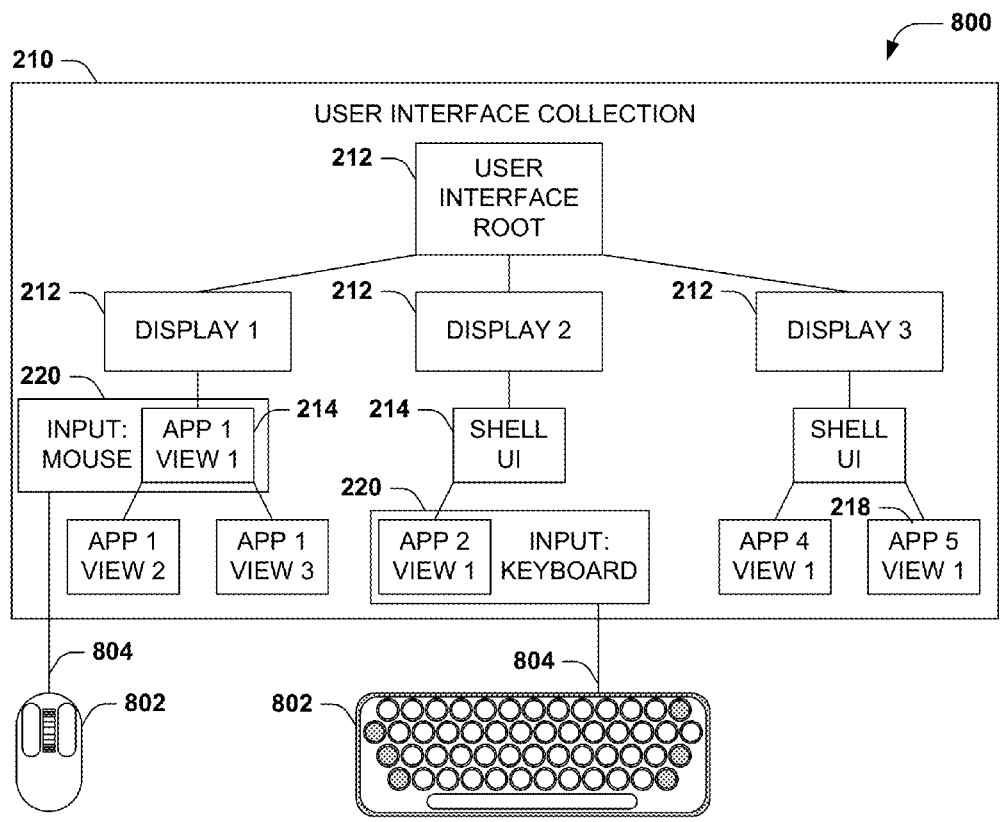
FIG. 8 is an illustration of an example scenario featuring a mapping of input devices to a variety of views of a user interface collection, in accordance with the techniques presented herein.

FIG. 8 presents an illustration of an example scenario 800 featuring a first variation of this fourth aspect, wherein a binding 220 of an input component 802 with a view 116 of an application 112 may be achieved by creating an association 804 between the input component 802 and a view entry 214. Such binding 220 may enable a discrete user interaction of a user 102 with the views 116 presented on a particular display 108, without regard to the user interaction with other views 116 presented on the same or other displays 108. As a first such example, different input components 802 may be concurrently bound to different views 116 on the same display 212.

As a second variation of this fourth aspect, the user interface collection 210 may permit the input focus metaphor to be applied on a per-display basis. For example, respective displays 108 may further comprise an input focus that is associated with a selected view 116 presented on the display 108. Responsive to receiving, from an input component 802 that is not bound to a view 116, user input that is directed to a selected display 108, the device 104 may direct the user input to the selected view 116 that is associated with the input focus. Further, responsive to receiving a request to associate a second view 116 with the input focus of the selected display 108, the device 104 may dissociate the input focus and the selected view 116, and associate the input focus and the second view 116.

As a third variation of this fourth aspect, the device 104 may permit virtual displays 108 to be included in the display collection 106, such as a background or hidden region that may store views 116 that the user 102 occasionally wishes to view on a particular display 108, but otherwise wishes to maintain in the background without reserving a particular display 108. In such scenarios, the device 104 may, responsive to receiving a request to add a virtual display to the at least two displays 108 of the display collection 106, generate in the user interface collection 210 an arrangement 212 for the virtual display 108. The device 104 may also position the virtual display 108 relative to the at least two displays 108 in the user interface collection 210, e.g., conceptually placing the virtual display 108 to the right of a physical display 108, such that moving the mouse beyond the right border of the physical display 108 causes the device 104 to display the region of the virtual display 108 on the physical display 108.

As a fourth variation of this fourth aspect, the user interface collection 210 may support the projection and/or mirroring of a first display 108 on a second display 108. For example, responsive to receiving a request to project a selected view 116 from a first display 108 to a second display 108 (e.g., a display space created for a projector), the device 104 may present the selected view 116 on the second display 108, alternatively or additionally to presenting the selected view 116 to the first display 108.

Figure 9:
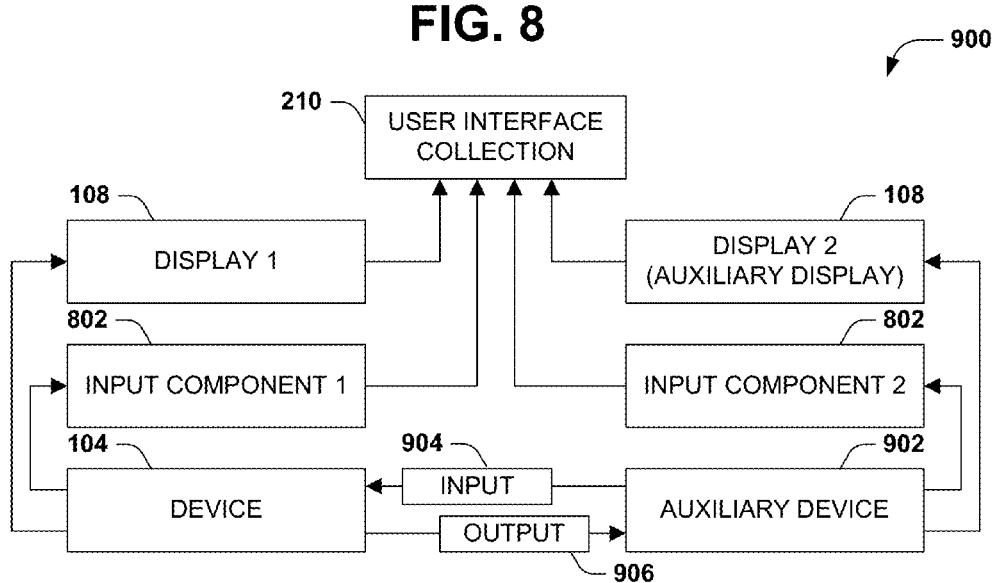
FIG. 9 is an illustration of an example scenario featuring a coordination of devices to present a computing environment across multiple displays, in accordance with the techniques presented herein.

FIG. 9 presents an illustration of an example scenario 900 featuring a fifth variation of this fourth aspect, wherein the user interface collection 210 enables the device 104 to include, as a display 108 of the display collection 106, an auxiliary display 108 that is connected to an auxiliary device 902, and accessible to the device 104 through the auxiliary device 902. The user interface collection 210 may add an arrangement 212 of view entries 214 for the auxiliary display 108, and the device 104 may transmit output 906, such as video, to the auxiliary device 902 for presentation on the auxiliary display 108. Moreover, the auxiliary device 902 may provide access to an auxiliary input component 802, such as a keyboard or mouse connected to the auxiliary device 902, and may transmit input 904 to the device 104 for application within the computing environment 110. Many such variations in the integration of various components with the computing environment 110 may be included in embodiments of the techniques presented herein.

F. Computing Environment

Figure 10:
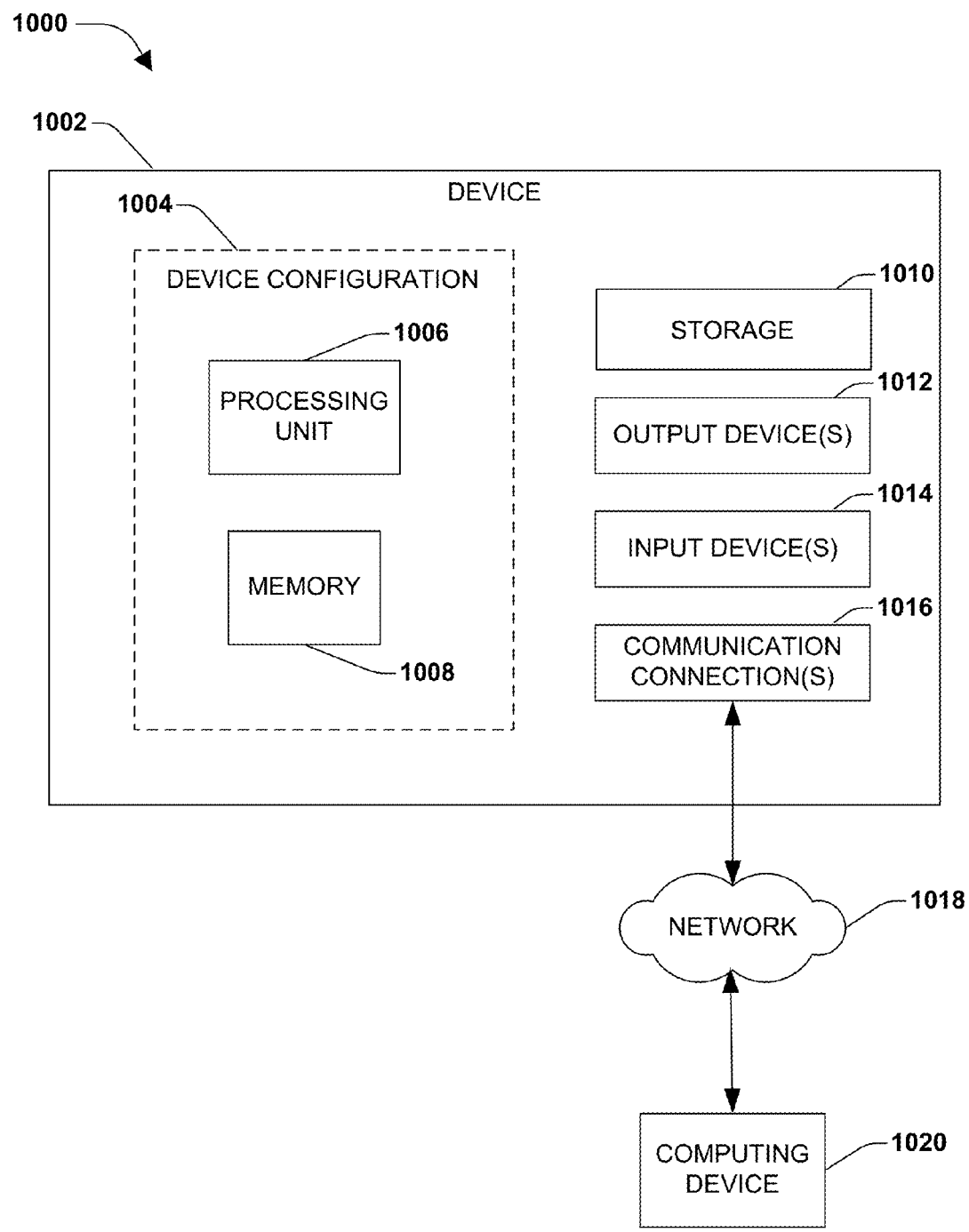
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a computing environment on at least two displays, the method involving a device having a processor and comprising:
executing, on the processor, instructions that cause the device to:
generate a user interface collection comprising, for respective displays, an arrangement of view entries for respective views presented on the display;
responsive to receiving a request to present an application on a selected display, create, in the arrangement of view entries for the selected display, a new view entry representing a view of the application at a position on the selected display; and
responsive to receiving a request to apply a layout to a selected display, apply the layout to the arrangement of the at least one view entry for the selected display.

2. The method of claim 1, wherein:
the arrangement of view entries further comprises a user interface element tree; and
creating the new view entry further comprises: inserting the new view entry as a node of the user interface element tree.

3. The method of claim 1, wherein:
respective applications are represented in the user interface collection as an application container encapsulating the view entries of respective views of the application; and
creating the new view entry further comprises: creating the new view entry in the application container for the application.

4. The method of claim 3, wherein executing the instructions further causes the device to, responsive to receiving a request to move an application from a first display to a second display, move the application container encapsulating the view entries of respective views of the application from the arrangement for the first display to the arrangement for the second display.

5. The method of claim 4, wherein:
the application is associated with a related application within the computing environment; and
executing the instructions further causes the device to, responsive to moving the application container for the application, move the application container encapsulating the view entries of respective views of the related application from the arrangement for the first display to the arrangement for the second display.

6. The method of claim 1, wherein executing the instructions further causes the device to, responsive to moving a view of an application in the arrangement of view entries for a selected display, adjust the layout for the selected display according to the moving of the view of the application.

7. The method of claim 1, wherein:
the device further comprises a layout template set comprising at least one layout template; and
executing the instructions further causes the device to:
responsive to receiving a request to present the layout template set, presents the layout template set; and
responsive to receiving a selection of a selected layout template for a selected display, applies the selected layout template to the selected display.

8. The method of claim 7, wherein executing the instructions further causes the device to, responsive to receiving a request to store a new layout template in the layout template set, store the new layout template in the layout template set.

9. A device that presents a computing environment, the device comprising:
at least two displays;
a processor; and
a memory storing instructions that, when executed by the processor, provide a system comprising:
a display manager that generates in the memory a user interface collection comprising, for respective displays, an arrangement of view entries for respective views presented on the display;
an application positioner that, responsive to receiving a request to present an application on a selected display, creates, in the arrangement of view entries for the selected display, a new view entry representing a view of the application at a position on the selected display; and
a view manager that, responsive to receiving a request to apply a layout to a selected display, applies the layout to the arrangement of the at least one view entry for the selected display.

10. The device of claim 9, wherein the system further comprises: a shell chrome manager that, responsive to receiving a request to create a shell user interface element on a selected display, creates, in the arrangement of view entries for the selected display, a shell view entry representing the shell user interface element at a position on the selected display.

11. The device of claim 10, wherein:
a selected shell view entry further comprises a spacing element positioned between a first view and a second view; and
the application positioner further, responsive to adjusting a position of the first view on a selected display, adjusts the position of the spacing element according to the first view and the second view.

12. The device of claim 10, wherein:
the request to create the shell user interface element spans at least two selected displays; and
the shell chrome manager, responsive to receiving the request, further creates, within respective selected displays, a shell view entry representing the shell user interface element at a position on the selected display.

13. The device of claim 10, wherein the system further comprises:
an application presentation history representing a history of applications presented on the display including a current view; and
an application transitioner that, responsive to receiving a request to transition from the current view to a next view for a selected display:
records the next view in the application presentation history for the selected display; and
rearranges a selected view entry of the next view above the current view within the user interface collection for the selected display.

14. The device of claim 13, wherein the system further comprises an application switcher that:
responsive to receiving a request to present a list of views on a selected display, presents the application presentation history of the views on the selected display; and responsive to receiving a selected view from the application presentation history, invokes the application transitioner to select the selected view as the current view.

15. A memory storing instructions that, when executed on a processor of a device having access to at least two displays, cause the device to present a computing environment, by:
   generating a user interface collection comprising, for respective displays, an arrangement of view entries for respective views presented on the display;
   responsive to receiving a request to present an application on a selected display, creating, in the arrangement of view entries for the selected display, a new view entry representing a view of the application at a position on the selected display; and
   responsive to receiving a request to apply a layout to a selected display, applying the layout to the arrangement of the at least one view entry for the selected display.

16. The memory of claim 15, wherein executing the instructions further causes the device to, responsive to receiving a request to bind an input component of the computing environment to a view, bind the input component to the view.

17. The memory of claim 16, wherein:
   respective displays further comprise an input focus that is associated with a selected view; and
   executing the instructions further causes the device to:
      responsive to receiving, from an input component that is not bound to a view, user input that is directed to a selected display, direct the user input to the selected view that is associated with the input focus; and
      responsive to receiving a request to associate a second view with the input focus of the selected display:
         dissociate the input focus and the selected view; and
         associate the input focus and the second view.

18. The memory of claim 15, wherein executing the instructions on the processor further causes the device to, responsive to receiving a request to add a virtual display to the at least two displays:
   generate in the user interface collection an arrangement for the virtual display; and
   position the virtual display relative to the at least two displays in the user interface collection.

19. The memory of claim 15, wherein:
   a selected display of the at least two displays is accessible to the device through an auxiliary device; and
   executing the instructions on the processor further causes the device to, responsive to receiving a request to transmit output for the selected display to the auxiliary device for presentation to the user.

20. The memory of claim 15, wherein executing the instructions on the processor further causes the device to, responsive to receiving a request to project a selected view from a first display to a second display, present the selected view on the second display in addition to the first display.

* * * * *